(12) United States Patent
Gorton

(10) Patent No.: US 12,510,328 B2
(45) Date of Patent: Dec. 30, 2025

(54) MODIFIED LONG GUN MOUNTING DEVICE

(71) Applicant: Stuart Albert Gorton, Longmont, CO (US)

(72) Inventor: Stuart Albert Gorton, Longmont, CO (US)

( * ) Notice: Subject to any disclaimer, the term of this patent is extended or adjusted under 35 U.S.C. 154(b) by 199 days.

(21) Appl. No.: 18/313,928

(22) Filed: May 8, 2023

(65) Prior Publication Data
US 2024/0377158 A1    Nov. 14, 2024

(51) Int. Cl.
*F41C 33/00* (2006.01)
*A45F 3/08* (2006.01)
*A45F 3/00* (2006.01)
*A45F 3/04* (2006.01)

(52) U.S. Cl.
CPC .............. *F41C 33/007* (2013.01); *A45F 3/08* (2013.01); *A45F 2003/003* (2013.01); *A45F 2003/045* (2013.01)

(58) Field of Classification Search
CPC .... F41C 33/007; A45F 3/08; A45F 2003/003; A45F 2003/045
USPC ........................................................ 224/149
See application file for complete search history.

(56) References Cited

U.S. PATENT DOCUMENTS

| | | | | |
|---|---|---|---|---|
| 3,334,794 A * | 8/1967 | Saari | ...................... | F42B 39/02 224/931 |
| 3,498,511 A * | 3/1970 | Morton | ................. | F41C 33/003 224/149 |
| 4,057,180 A * | 11/1977 | Whittaker | ................. | B60R 7/14 248/316.1 |
| 4,964,553 A * | 10/1990 | Glynn | ................... | F41C 33/003 224/913 |
| 5,642,847 A * | 7/1997 | DeMeo | ................. | F41C 33/007 224/907 |
| 5,664,721 A * | 9/1997 | Homeyer | .............. | F41C 33/005 224/916 |
| 5,927,574 A * | 7/1999 | Ruesink | ................ | F41C 33/003 224/907 |
| 5,975,389 A * | 11/1999 | Braun | ........................ | A45F 4/02 224/916 |
| 6,019,404 A * | 2/2000 | Pasquale | .................. | F41A 17/44 294/219 |
| 6,152,338 A * | 11/2000 | Smith | ........................ | A45F 3/14 224/675 |
| 6,763,987 B1 * | 7/2004 | Eberle | ........................ | A45F 3/04 224/652 |
| 7,467,719 B2 * | 12/2008 | Crowell | .................. | F41A 23/18 211/64 |
| 8,678,206 B2 * | 3/2014 | Kubiniec | ................ | F41A 23/18 211/64 |

(Continued)

Primary Examiner — Peter N Helvey

(57) ABSTRACT

A mounting device attachable on a backpack or the like is described that allows a backpack wearer to remove a long gun from the backpack and reattach it without removing the backpack, without assistance from a second person, and without complex mechanical devices. The mounting device includes a generally rigid, length adjustable base member with a generally rigid lower member pivotally attached to a first end, wherein the lower member includes a horizontal surface for receiving a long gun butt and a means for securing the butt to it. A grasping mechanism is attached to a second end of the base member and receives and secures a long gun barrel or barrel and forend with the use of a gun sling or leash. A coupling means is also included that allows the mounting device to be attached to a multiplicity of backpack types.

13 Claims, 6 Drawing Sheets

(56) References Cited

U.S. PATENT DOCUMENTS

| | | | |
|---|---|---|---|
| 9,194,655 B1* | 11/2015 | Cha | A45F 3/14 |
| 2005/0000995 A1* | 1/2005 | Eberle | F41C 33/0209 |
| | | | 224/652 |
| 2005/0040199 A1* | 2/2005 | Lemens | A63C 11/025 |
| | | | 224/259 |
| 2006/0163304 A1* | 7/2006 | Slesar | A45F 5/02 |
| | | | 224/601 |
| 2007/0145091 A1* | 6/2007 | Meesey | F41C 33/06 |
| | | | 224/637 |
| 2007/0145092 A1* | 6/2007 | Eberle | A45F 3/04 |
| | | | 224/652 |
| 2010/0012691 A1* | 1/2010 | Hyle | F41C 33/005 |
| | | | 224/149 |
| 2010/0025446 A1* | 2/2010 | Eberle | A45F 3/04 |
| | | | 224/652 |
| 2010/0193558 A1* | 8/2010 | Fraser Jakal | A45F 5/14 |
| | | | 224/676 |
| 2011/0042427 A1* | 2/2011 | Goransson-Sonnefelt | |
| | | | F41C 33/005 |
| | | | 224/682 |
| 2012/0292353 A1* | 11/2012 | Andersen | F41C 33/005 |
| | | | 224/191 |
| 2012/0305616 A1* | 12/2012 | Smith | F41B 5/1461 |
| | | | 224/614 |
| 2013/0284784 A1* | 10/2013 | Jakal | A45F 3/04 |
| | | | 224/663 |
| 2016/0037895 A1* | 2/2016 | Humphreys | A45F 3/10 |
| | | | 224/633 |
| 2016/0187101 A1* | 6/2016 | Erden | F41C 33/048 |
| | | | 224/264 |
| 2018/0289135 A1* | 10/2018 | Bezem | F41C 33/005 |
| 2019/0293385 A1* | 9/2019 | Gorton | A45F 3/14 |

* cited by examiner

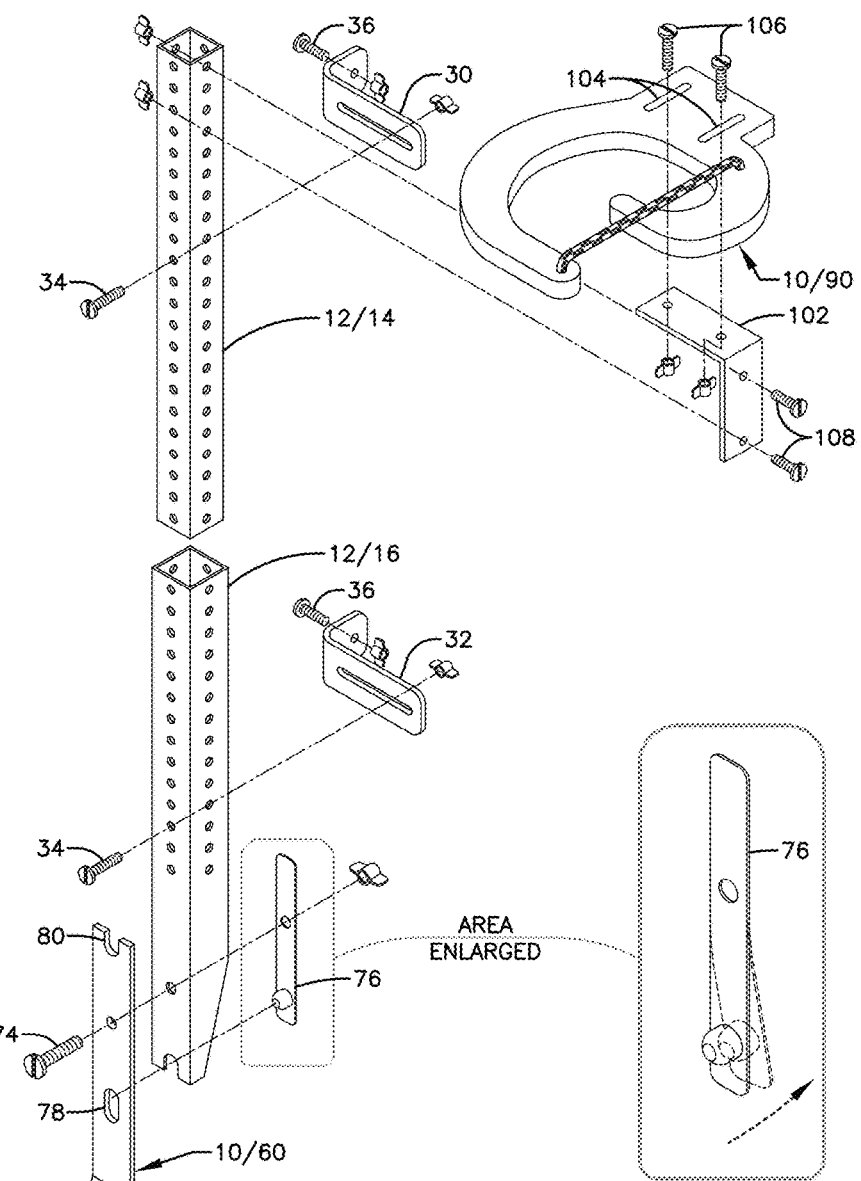
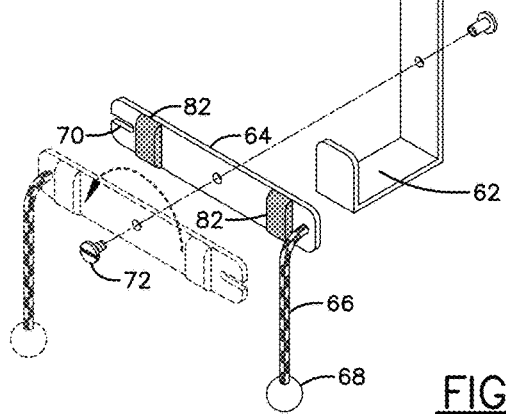
FIGURE 3B
FIGURE 3A

MODIFIED LONG GUN MOUNTING DEVICE

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates to a device that allows a long gun to be firmly affixed on a backpack and more particularly allows the wearer of the backpack to secure and remove the long gun without the need of removing the pack, without the need of outside assistance, and without the use of complex mechanical devices. While in the act of hunting it is often desirable for the hunter to wear a backpack in which to store such things as food, water, extra clothing, ammunition and the like. It is also often desirable for the hunter to have their hands free in order to negotiate rough or brushy terrain, manipulate trekking poles, or operate binoculars. In the past the hunter might utilize a gun sling to suspend the long gun from one of their shoulders while also wearing a separate backpack. While the hunter is immobile a sling is generally effective at maintaining the long gun in a hands-free manner. While in motion however, one of the hunter's hands must be used to prevent the long gun from swinging around and from sliding off the hunter's shoulder.

In an attempt to mitigate this, there have been many varied examples in the prior art of means and mechanisms that allow a long gun to be affixed to a backpack, and thus free the hands of the backpack wearer. These generally fall into one of three categories concerning the access the wearer of the backpack has to a long gun, unaided by a second person.

In the first of these categories, the wearer of a backpack must remove the pack to either remove the long gun from it or reattach the long gun to it. Such a mechanism is disclosed in U.S. Pat. No. 4,754,904 by Fischer, and again in U.S. Pat. No. 6,290,114 by Berberian. While this latter art specifies that its use is for a hunting bow, it is obvious that it could be adapted for use with a long gun. Whether used to transport a hunting bow or long gun, the wearer of either of these backpacks is required to remove the pack in order to manipulate straps and buckles that secure the hunting implement to the pack. This action results in considerable movement by the wearer that can alarm game, and consumes time that a hunter rarely has in abundance.

In the second category of prior art, the wearer of a backpack can remove a long gun from the pack without removing the pack itself, but due to a plurality of straps and fasteners, must remove the pack to reattach the long gun to it. This is the case for U.S. Pat. No. 995,458 disclosed by Harriman, U.S. Pat. No. 7,735,701 disclosed by Eberle, U.S. Pat. No. 9,074,840 disclosed by Andersen, as well as U.S. Pat. No. 9,194,655 disclosed by Cha. While devices within this second category allow a hunter to more quickly and conveniently remove a long gun than those devices within the first category, the hunter is forced to take off their backpack after every encounter with game in order to reattach the long gun to the pack.

The third category of prior art includes those concepts that could conceivably allow a backpack wearer to remove a long gun from the backpack and reattach it without the need of removing the pack itself. One concept within this category utilizes a gun scabbard that is attached to a backpack and was disclosed by Eberle in U.S. Pat. No. 6,763,987, and again in U.S. Pat. Nos. 7,654,426 and 8,397,965. In order to remove the long gun from the scabbard though, the wearer is required to grasp and manipulate the long gun from a position above and behind their shoulder, a combination beyond the physical range of motion of many people, and one that is made more difficult if the hunter is wearing bulky cold weather clothing. The reinsertion of the long gun into the scabbard also requires that the wearer have a firm sense of the placement of the scabbard relative to their body, as the wearer has a limited view of the scabbard. An additional problem associated with this concept is that a substantial portion of the long gun extends above the head of the wearer, making it difficult to conveniently and quietly traverse the thick cover in which game often resides.

Another concept that potentially fits within the third category of prior art was disclosed in U.S. Patent Application Publication No. 2010/0012691 by Hyle. In this concept the barrel of the long gun is threaded through a circular shaped opening near the top of the backpack frame and the butt is placed in a cup like enclosure attached to the bottom of the backpack frame. While the butt of the long gun can be secured within the butt shaped cup, the circular opening allows the barrel to move relative to the backpack, creating an unwanted source of noise and instability. This problem is further exacerbated if the diameter of the circular opening is made large enough to allow for the passage of a front sight, which are commonly affixed to the end of long gun barrels. Another disadvantage of this concept is that the long gun is situated such that its placement conflicts with the free movement of the adjacent arm of the hunter.

One device that definitively satisfies the criteria presented herein for the third category was disclosed by Gorton in U.S. Pat. No. 10,473,425. While this device allows a backpack wearer to quickly, quietly, comfortably and conveniently affix and remove a long gun unaided by others and without removing the pack, the device specifies a complex mechanism to secure the barrel of the long gun. What is needed then is a device that exhibits all of the benefits of the Gorton art, but that incorporates a simpler grasping mechanism. By virtue of its simplicity, such a device would be even quicker and quieter to use, while still maintaining the comfort and convenience offered by the original Gorton art. Additionally, without the mechanical complexity, such a device would be easier to fabricate and could be considerably lighter in weight.

SUMMARY OF THE INVENTION

The present invention contemplates a modified long gun mounting device that greatly improves the access a hunter has to a long gun, or similarly shaped object, that is carried on the hunter's backpack.

According to the present invention, the mounting device includes a generally rigid lower member having a horizontal surface for receiving the butt of a long gun and a way of securing the butt to the lower member. The mounting device also includes a grasping mechanism that secures the barrel or barrel and forend of the long gun (forend), wherein a traditional gun sling or a leash is used to help secure and remove the forend from the grasping mechanism.

In one embodiment of the present invention, the long gun butt is secured to the lower member with the use of an elastic restraint having one end attached to a first end of a horizontal member, while a stop, attached to the free end of the elastic restraint, engages a stop slit in a second end of the horizontal member. Since the stop can easily and quickly engage and disengage the stop slit, the long gun butt can similarly be easily and quickly restrained and freed from the lower member. In this embodiment, the horizontal member can be rotated 180 degrees about its attachment point to the lower member, so as to more conveniently accommodate right-handed or left-handed users.

In another embodiment of the invention, the grasping mechanism includes an inner guiding surface and an outer guiding surface that together help direct the forend of the long gun to a resting surface. While on the resting surface, the forend is maintained on the resting surface with the use of an elastic restraint.

In another embodiment of the invention, the distance between the horizontal surface, associated with the lower member, and the grasping mechanism can be adjusted so long guns of varying length can be accommodated.

In another embodiment of the invention, the grasping mechanism is attached to the upper end of a rigid base member and the lower member is pivotally attached to the lower end of the same base member.

In another embodiment of the invention, the base member consists of an upper tube that slides within a lower tube, allowing the distance between the lower member—as well as the horizontal surface associated with the lower member—and the grasping mechanism to be adjusted so as to better accommodate different long gun lengths.

In another embodiment of the invention, the distance between the forend of the long gun and the base member can be adjusted.

In another embodiment, the invention features a means of attaching the mounting device to a backpack.

A principal advantage of the invention resides in the ability of the wearer of a modified long gun mounting device equipped backpack to remove a long gun, or other similarly shaped elongated object, from the pack and reattach it to the pack without the need of removing the pack itself, without the need of uncomfortably reaching above and behind one's shoulder and without the assistance of a second person.

Another advantage of the invention is found in the ability of the mounting device to be attached to a wide variety of backpack types and sizes.

Another advantage of the invention lies in the adjustability of the mounting device, allowing it to accommodate a wide variety of long gun types and sizes.

Another advantage of the invention resides in the rigid and secure manner in which the long gun is mounted to a backpack, and thus to the wearer of the backpack.

Another advantage of the invention is found in the placement of the mounting device and long gun substantially behind the head and body of the backpack wearer, where they are better shielded from brush while the wearer passes through it.

Another advantage of the invention lies in the orientation of the resting surface, associated with the grasping mechanism, which helps ensure that the long gun forend remains firmly in contact with the resting surface while moving forward through thick brush and the like.

Another advantage of the invention lies in the orientation of the stop slit, associated with the horizontal member, which helps ensure that the stop remains secured within the stop slit while moving forward through thick brush and the like.

Another advantage of the invention is found in the shape and location of the grasping mechanism, which situated just above the rear sight or optic of the long gun, establishes a buffer area that helps to protect the site or optic from unwanted contact with brush, trees or the like.

Still other advantages and benefits of the invention will become apparent to those skilled in the art upon a reading and understanding of the following detailed description and associated drawing figures.

DESCRIPTION OF THE VIEWS OF THE DRAWINGS

A fuller understanding of the nature and objects of the present invention will become apparent upon consideration of the following detailed description, taken in connection with the accompanying drawings, wherein:

FIG. 3A is a perspective view of the various parts that make up the preferred embodiment of the mounting device;

FIG. 3B is an enlarged perspective view of a spring button, depicting its bending motion;

DETAILED DESCRIPTION OF THE PREFERRED EMBODIMENTS

Figure 1:
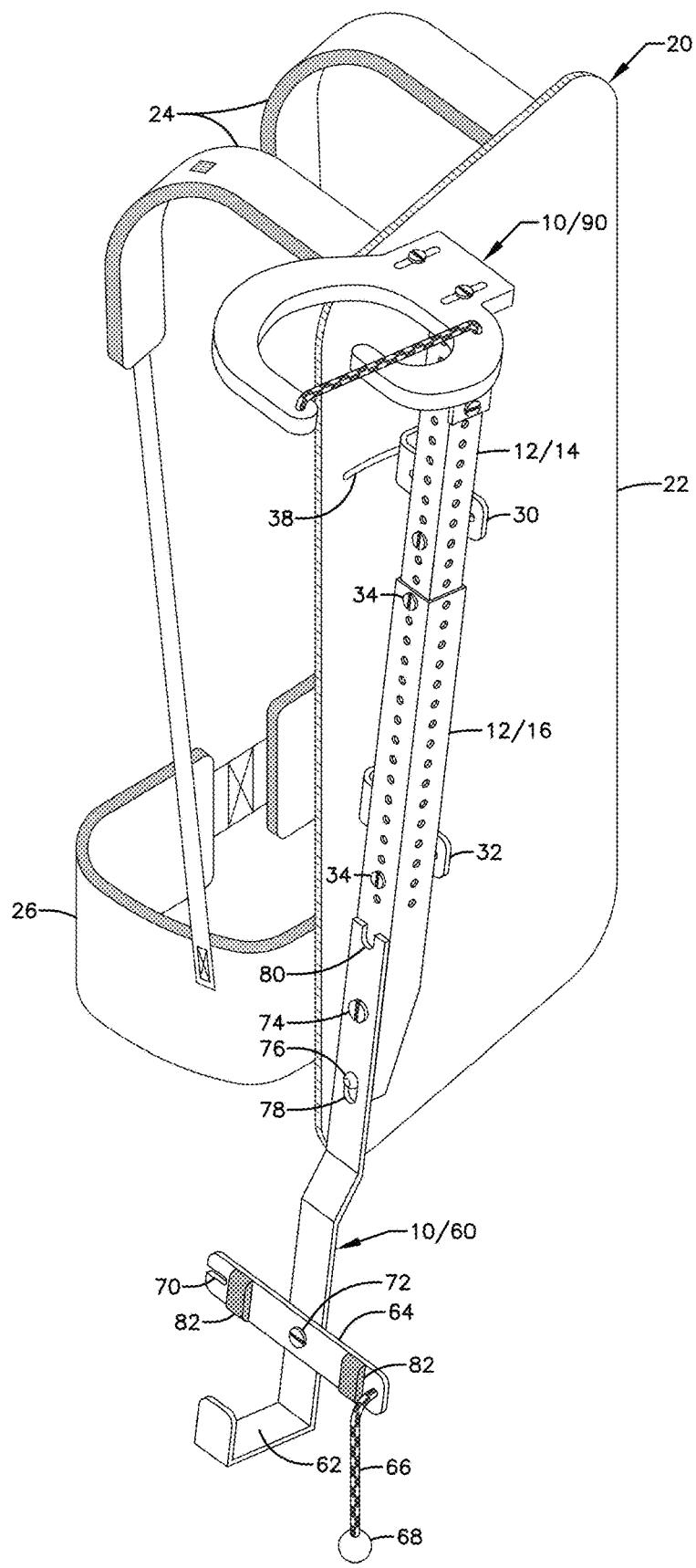
FIG. 1 is a perspective view of the modified long gun mounting device, showing the invention attached to a simple backpack.
Figure 2:
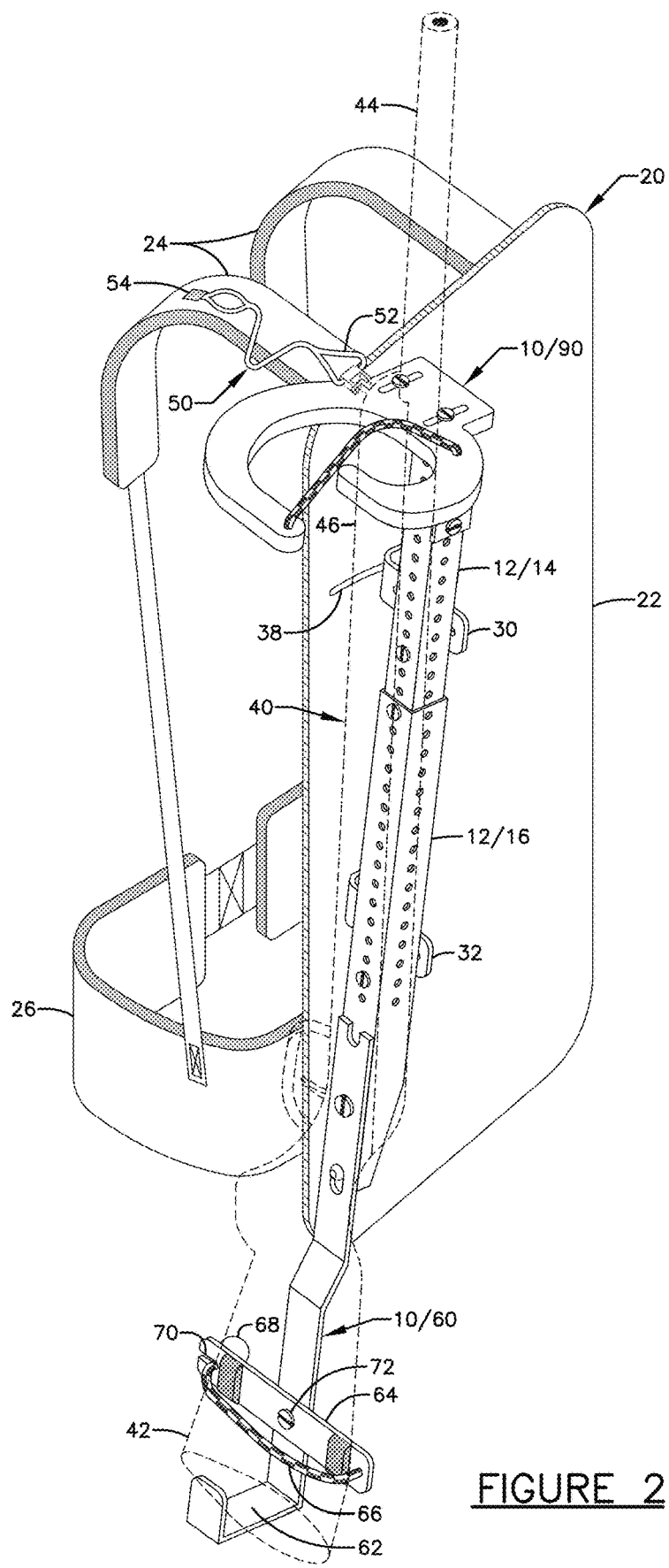
FIG. 2 is a perspective view of the mounting device of FIG. 1 with a long gun secured to it.

Referring now to the drawings, in FIG. 1 there is shown a modified long gun mounting device 10, hereafter described as mounting device 10, attached to a backpack 20, itself having a frame 22, a pair of shoulder straps 24, and a waist belt 26. The amalgamation of mounting device 10, attached to backpack 20, allows for the convenient transportation of a long gun 40, as well as the easy attachment and removal of long gun 40 to and from backpack 20 while it is being worn (FIG. 2 depicts long gun 40 secured to mounting device 10, and therefore to backpack 20).

The various components that make up the preferred embodiment of mounting device 10 are illustrated in FIG. 3A. These components begin with a base member 12 which is composed of an upper tube 14 that fits within a lower tube 16. The telescoping nature of upper tube 14 and lower tube 16 allows for the length of base member 12 to be adjusted to accommodate a variety of long gun 40 configurations.

One method for attaching base member 12 to frame 22 is with the use of an upper frame bracket 30 and a lower frame bracket 32 that connect to base member 12 with the use of base member bolts 34 and to frame 22 with the use of frame bolts 36. In order to allow for greater adjustability between mounting device 10 and backpack 20, a frame slit 38 (shown in FIGS. 1 and 2) can be provided that permits upper frame bracket 30 to rotate about lower frame bracket 32.

On the lower end of base member 12, a lower member 60 can be attached that includes a horizontal surface 62 on which a butt 42 of long gun 40 can rest. In order to secure butt 42 to lower member 60, lower member 60 can also include a horizontal member 64 having an elastic member 66 attached to one end. To a free end of elastic member 66, a stop 68 can be fixed that can engage a stop slit 70 located on the end of horizontal member 64 opposite the point of attachment of elastic member 66. Horizontal member 64 can be attached to lower member 60 with the use of a binder screw 72, so as to allow horizontal member 64 to be rotated 180 degrees to better allow for ambidextrous usage.

Figure 4A:
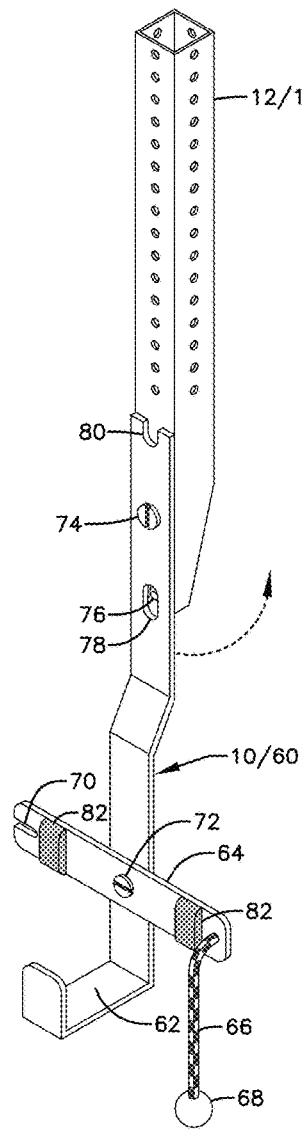
FIG. 4A is a perspective view of the lower member in the ready for use position.
Figure 4B:
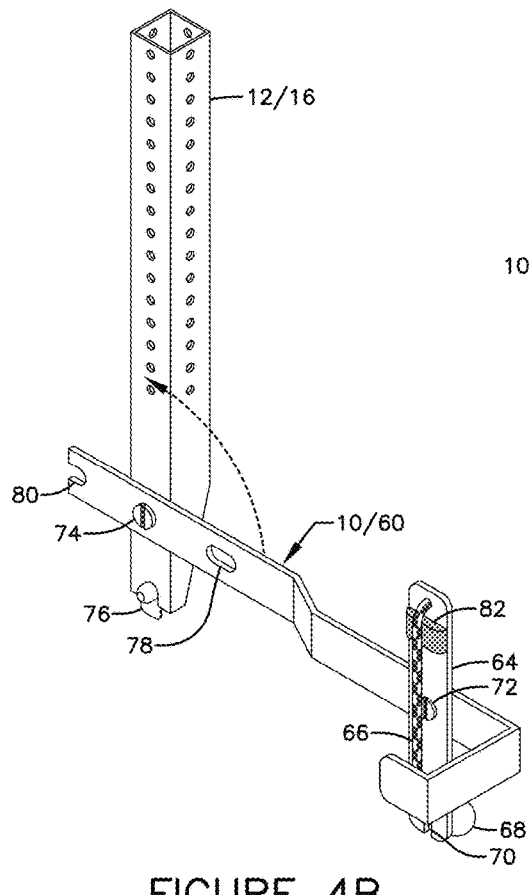
FIG. 4B is a perspective view of the lower member in a transitional position in between the ready for use position and the out of the way position.
Figure 4C:
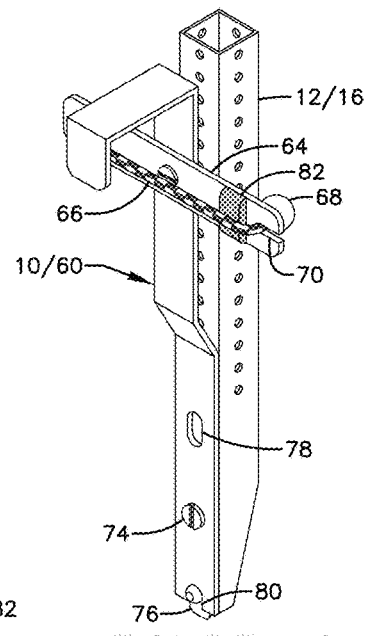
FIG. 4C is a perspective view of the lower member in the out of the way position.

In order to allow lower member 60 to be rotated up and out of the way when not in use, lower member 60 can pivot about a lower member bolt 74, as is depicted in FIGS. 4A through 4C. To secure lower member 60 in either the ready for use position (FIG. 4A) or the out of the way position (FIG. 4C) a spring button 76, commonly used to adjust the length of telescoping tubing (the bending motion of spring button 76 is best shown in FIG. 3B), can engage a ready for use hole 78, or an out of the way hole 80, respectively.

Figure 5A:
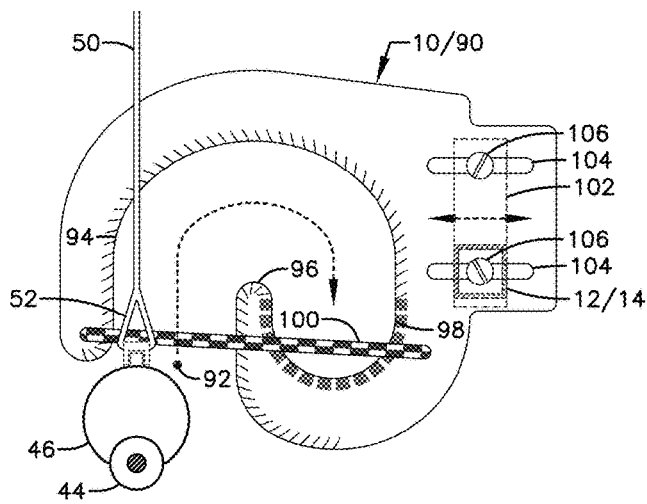
FIG. 5A is a plan view of the grasping mechanism with the barrel and forend of the long gun in an unsecured position.
Figure 5B:
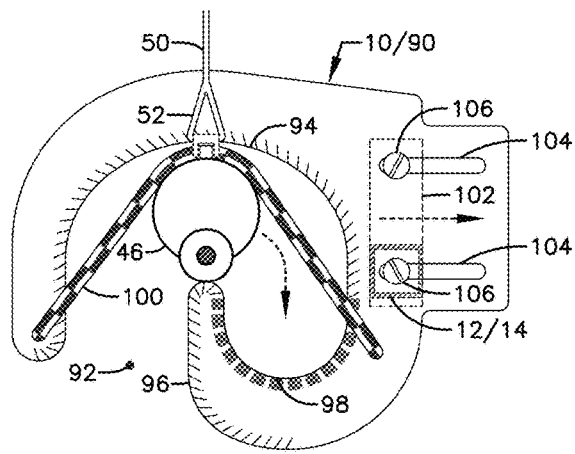
FIG. 5B is a plan view of the grasping mechanism with the barrel and forend of the long gun in a transitional position in between an unsecured position and a secured position.
Figure 5C:
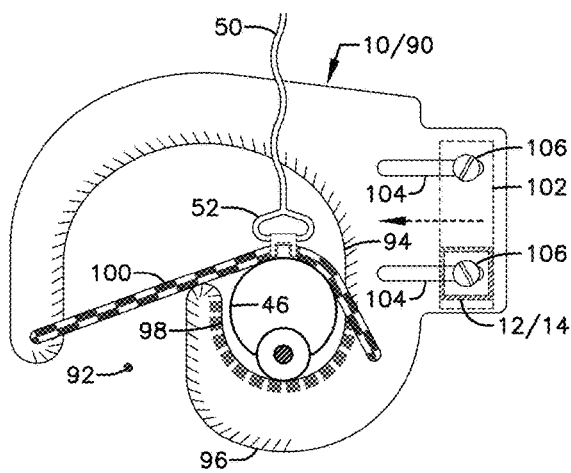
FIG. 5C is a plan view of the grasping mechanism with the barrel and forend of the long gun in a secured position; and, FIG. 6 is a perspective view of the mounting device—the combination of the lower member and the grasping mechanism—attached to a typical backpack frame. This drawing, as well as all of the other drawing, are representative of a modified long gun mounting device arranged to better accommodate a left-handed person. A mirror image of these drawing, mirrored about a vertical axis, would have an appearance more suitable for right-handed user.

On the upper end of base member 12, a grasping mechanism 90 can be attached for receiving and securing a barrel 44, or a barrel 44 and a forend 46 of long gun 40, hereafter referred to more simply as forend 46. The manner in which this can be accomplished while backpack 20 is being worn-rendering grasping mechanism 90 inaccessible to the hands of the wearer—is depicted in FIGS. 5A through 5C, where forend 46 is first positioned near a grasping mechanism opening 92 (FIG. 5A). From this point, tension is applied to a sling (not shown) or a leash 50-a simple rope or flexible cord with a first leash end 52 attached to forend 46—to counteract the resistance provided by an elastic restraint 100. Simultaneous to this action, forend 46 can be maneuvered in between an inner guiding surface 94 and an outer guiding surface 96 (FIGS. 5A and 5B) that together help direct forend 46 to a resting surface 98. Once there, tension on leash 50 can be relaxed, allowing the restraining force of elastic restraint 100 to secure forend 46 to resting surface 98 (FIG. 5C).

In the same way that leash 50 can be used to guide forend 46 from grasping mechanism opening 92 to resting surface 98, leash 50 can be used to direct forend 46 from resting surface 98 to grasping mechanism opening 92 and away from grasping mechanism 90. This process can be visualized by beginning at FIG. 5C, and proceeding backwards to FIG. 5B and finally to FIG. 5A.

While backpack 20 is being worn and long gun 40 firmly secured to it by way of mounting device 10, it would be convenient to have ready access to a free leash end 54 of leash 50. Although in the preferred embodiment free leash end 54 is conveniently maintained on a shoulder strap 24 with the use of a hook and loop fastener (FIG. 2), other types of fasteners, such as snap fasteners or magnets, could just as well be utilized and a different point of attachment chosen to better accommodate the comfort and preferences of the user.

The parts associated with one method of coupling grasping mechanism 90 to base member 12 are best depicted in FIG. 3A, where a grasping mechanism bracket 102 attaches to grasping mechanism 90 by way of a pair of upper bracket bolts 106, and to base member 12 by way of a pair of lower bracket bolts 108. Instead of standard holes, upper bracket bolts 106 can engage a pair of grasping mechanism slits 104 that allow for the distance from resting surface 98 to base member 12 to be adjusted so as to accommodate various long gun 40 configurations. This adjustability is depicted in FIGS. 5A through 5C.

Figure 6:
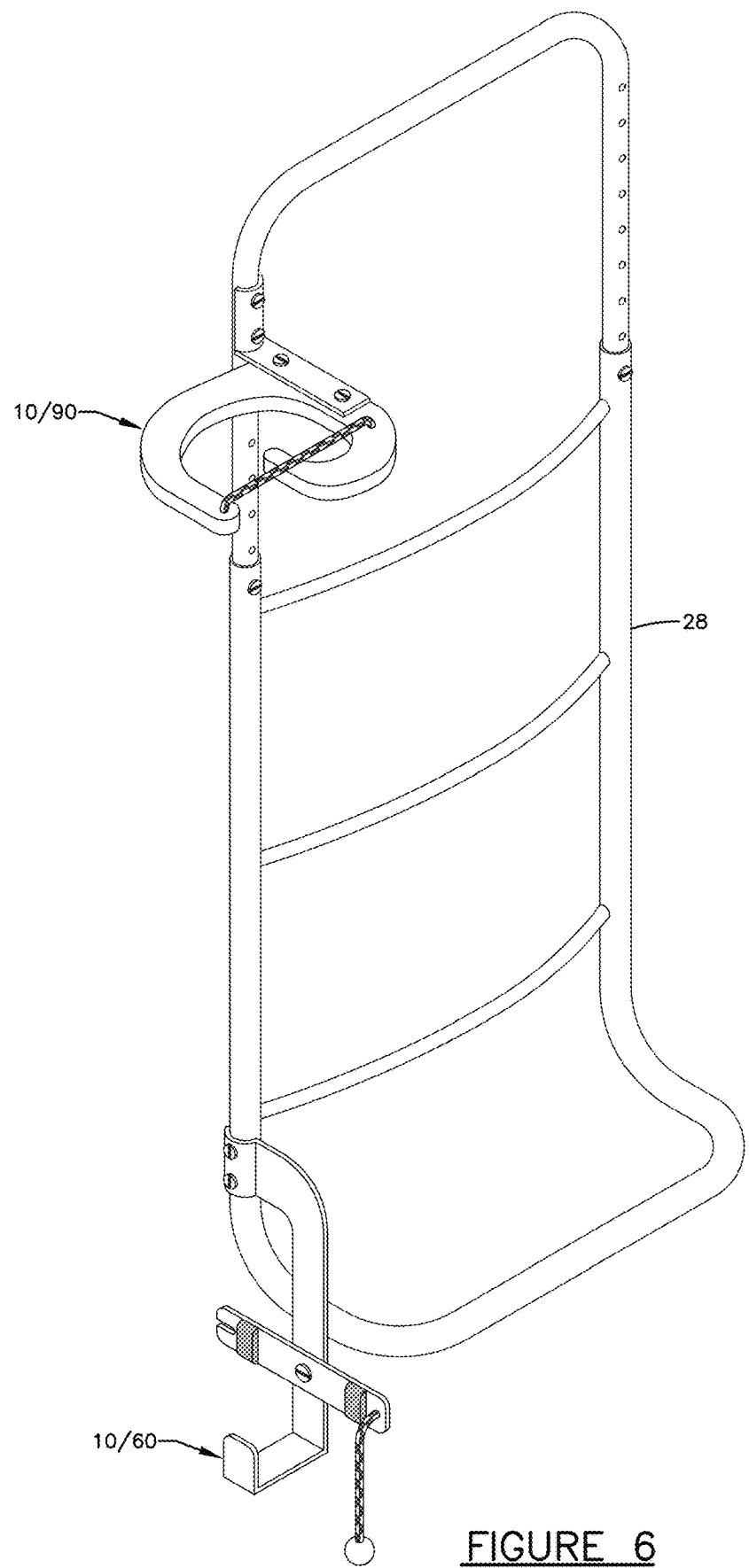

In many instances it would be convenient to attach mounting device 10—the combination of lower member 60 and grasping mechanism 90—to a backpack having a standard frame 28, a typical example of which was described in U.S. Pat. No. 6,179,188 by Gleason, the disclosure of which is incorporated by reference. With this style of backpack, or other rigidly framed backpack, one embodiment of the present invention could comprise attaching mounting device 10 more directly to standard frame 28 (FIG. 6). In this embodiment, standard frame 28 takes the place of, and performs the same function as, base member 12. In yet another embodiment—similar to the preferred embodiment in that it incorporates base member 12—commercially available webbing or straps can be used to attach mounting device 10 to backpack 20, or more typically to a bag attached to backpack 20 (this latter embodiment is not shown).

While it is necessary for mounting device 10 to be rugged in construction, it is also preferable that it is as light in weight as possible. In order to satisfy both of these goals, the preferred embodiment of mounting device 10 can use lightweight, yet rugged materials such as aluminum, plywood, fiberglass composite, carbon fiber composite, or the like in its construction. Since the various components of mounting device 10 perform unique functions, facing varying forces and levels of wear, it could be most advantageous to use different materials for specific components. For components that could make contact with vegetation, producing unwanted noise, those components can be covered with sound reducing materials such as rubberized paint or an adhesive backed foam or felt tape. Also, in an effort to eliminate unwanted noise that might be produced by butt 42 shifting against horizontal member 64, a pair of bumpers 82, composed of a compressible material, can be applied to horizontal member 64.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A mounting device attachable on a backpack or the like, said mounting device comprising:
   a generally rigid lower member having a horizontal surface for receiving a butt of a long gun and a securing means for securing said butt to said lower member;
   a grasping mechanism for receiving a barrel or barrel and forend of said long gun, wherein said grasping mechanism includes an inner guiding surface and an outer guiding surface, wherein said inner and outer guiding surfaces help direct said barrel or barrel and forend of said long gun to a resting surface; and, an elastic restraint, wherein said elastic restraint maintains said barrel or barrel and forend of said long gun on said resting surface.

2. The mounting device as defined in claim 1 wherein said lower member securing means includes an elastic member, wherein a first end of said elastic member is fastened to a first end of a horizontal member, and a stop, fastened to a second end of said elastic member, engages a stop slit in a second end of said horizontal member for quick connect/disconnect therewith.

3. The mounting device as defined in claim 2 wherein said horizontal member is pivotally attached to said lower member.

4. The mounting device as defined in claim 1 wherein the distance between said horizontal surface of said lower member is adjustable relative to said grasping mechanism.

5. The mounting device as defined in claim 1 wherein said lower member and said grasping mechanism are fastened to opposite ends of a generally rigid base member.

6. The mounting device as defined in claim 5 wherein said lower member is pivotally attached to said base member.

7. The mounting device as defined in claim 5 wherein the distance between said barrel or barrel and forend of said long gun is adjustable relative to said base member.

8. The mounting device as defined in claim 5 wherein a coupling means attaches said base member to said backpack and form a stable long gun mounting platform.

9. A mounting device attachable on a backpack or the like, said mounting device comprising:
    a generally rigid and elongated base member, said base member being adjustable in length;
    a generally rigid lower member pivotally attached to a first end of said base member, wherein said lower member includes a horizontal surface for receiving a long gun butt;
    an elastic member for securing said long gun butt to said lower member, wherein a first end of said elastic member is fastened to a first end of a horizontal member and a stop is fastened to a second end of said elastic member, wherein said stop engages a stop slit in a second end of said horizontal member for quick connect/disconnect therewith;
    a grasping mechanism attached to a second end of said base member, wherein said grasping mechanism includes an opening flanked by an inner guiding surface and an outer guiding surface, wherein said inner and outer guiding surfaces help direct said barrel or barrel and forend of said long gun to a resting surface, and an elastic restraint holds said barrel or barrel and forend of said long gun on said resting surface;
    a leash or a sling for maneuvering said barrel or barrel and forend of said long gun between said inner and outer guiding surfaces, wherein said leash or said sling counteracts the resistance provided by said elastic restraint; and,
    a coupling means for attaching said mounting device to said backpack and form a long gun accessible transportation system on the back of said backpack user.

10. The mounting device as defined in claim 9 wherein said horizontal member is pivotally attached to said lower member.

11. The mounting device as defined in claim 9 wherein the distance between said resting surface is adjustable relative to said base member.

12. A combination comprising:
    a backpack having a waist belt and at least one shoulder strap; and,
    a modified long gun mounting device comprising:
    a generally rigid and elongated base member, wherein said base member is adjustable in length;
    a generally rigid lower member pivotally attached to a first end of said base member, wherein said lower member includes a horizontal surface for receiving a long gun butt;
    an elastic member for securing said long gun butt to said lower member, wherein a first end of said elastic member is fastened to a first end of a horizontal member and a stop is fastened to a second end of said elastic member, wherein said stop engages a stop slit in a second end of said horizontal member for quick connect/disconnect therewith;
    a grasping mechanism attached to a second end of said base member, wherein said grasping mechanism includes an inner guiding surface and an outer guiding surface, wherein said inner and outer guiding surfaces help direct said barrel or barrel and forend of said long gun to a resting surface, and an elastic restraint holds said barrel or barrel and forend of said long gun firmly to said resting surface;
    a leash or a sling for maneuvering said barrel or barrel and forend of said long gun between said inner and outer guiding surfaces, wherein said leash or said sling counteracts the holding pressure provided by said elastic restraint; and,
    a coupling means for attaching said mounting device to said pack.

13. The mounting device as defined in claim 1 wherein said barrel or barrel and forend of said long gun is secured and removed from said grasping mechanism with the use of a sling or a leash.

* * * * *